United States Patent
Faehler

(10) Patent No.: US 7,608,348 B2
(45) Date of Patent: Oct. 27, 2009

(54) MAGNETIC MEDIUM FOR STORING INFORMATION

(75) Inventor: Sebastian Faehler, Dresden (DE)

(73) Assignee: Leibniz - Institut fuer Festkoerper-und Werkstoffforschung Dresden e.V., Dresden (DE)

( * ) Notice: Subject to any disclaimer, the term of this patent is extended or adjusted under 35 U.S.C. 154(b) by 503 days.

(21) Appl. No.: 11/108,942

(22) Filed: Apr. 18, 2005

(65) Prior Publication Data

US 2006/0068230 A1    Mar. 30, 2006

(30) Foreign Application Priority Data

May 10, 2004    (DE) ........................ 10 2004 024 757

(51) Int. Cl.
*G11B 5/66*    (2006.01)

(52) U.S. Cl. ..................... 428/836.1; 428/827; 428/832

(58) Field of Classification Search ........................ None
See application file for complete search history.

(56) References Cited

U.S. PATENT DOCUMENTS

| 2003/0108721 A1* | 6/2003 | Fullerton et al. ............ 428/195 |
| 2006/0188752 A1* | 8/2006 | Gusliyenko ................ 428/827 |

OTHER PUBLICATIONS

Gaidukova et al. (Phys. Solid State, 41 (11 ), 1999, 1885-1890).*
Troyanchuk et al. (Low Temp. Phys., 23(10), 1997, 807-809).*
Kuwahara et al. (Science, 270, 1995, 961+).*
Fath et al. (Science, 285, 1999, 1540-1542).*

FeRh/FePt exchange spring films for thermally assited magnetic recording media Jan-Ulrich Thiele, a) Stefan Maat, and Eric E. Fullerton, vol. 82, No. 17, Apr. 28, 2003, pp. 2859-2861.

Metamagnetism, By E. Stryjewski and N. Giordano Department of Engineering and Applied Science, Yale University, New Haven, Connecticut 06520, U.S.A. Advances in Physics, 1977, vol. 26, No. 5, 487-650.

Magnetic and transport properties of hte itinerant electron system Hf1-xTaxFe2 H.G.M. Duijn, E. Brueck, A.A. Menovsky, K.H.J. Buschow, and F.R. de Boer, pp. 4218-4220.

Textured growth of highly coercive L10 ordered FePt thin films on single crystalline and amorphous substrates M. Weisheit,* L. Schultz, and S. Faehler, pp. 1-3.

The Exchange-Spring Magnet: A New Material Principle for Permanent Magnets Eckart F. Kneller, Member, IEEE, and Reinhard Hawig pp. 3588-3600, IEEE Transactions on Magnetics, vol. 27, No. 4, Jul. 1991.

First-principles calculation of the magnetic anisotropy energy of $(Co)_n/(X)_m$ multilayers G.H. O. Daalderop, P.J. Kelly, and M.F.H. Schuurmans Physical Review B, vol. 42, No. 11, Oct. 15 1990-I ,pp. 7270-7273.

(Continued)

*Primary Examiner*—Holly Rickman
(74) *Attorney, Agent, or Firm*—Jordan and Hamburg LLP

(57) ABSTRACT

Magnetic medium for storing information, includes at least two materials A and B which are connected with one another, material A being a hard magnetic material, wherein material B is a material which exhibits metamagnetic behavior in a magnetic field, the metamagnetic behavior of the material being such that, even after passing repeatedly through an external magnetic field from 0 to 10 tesla at least at a magnetic field strength below 3 tesla, an increase in the magnetization occurs as a function of the magnetic field, the increase being superproportional and having a positive curvature.

29 Claims, 2 Drawing Sheets

OTHER PUBLICATIONS

Figure 1:
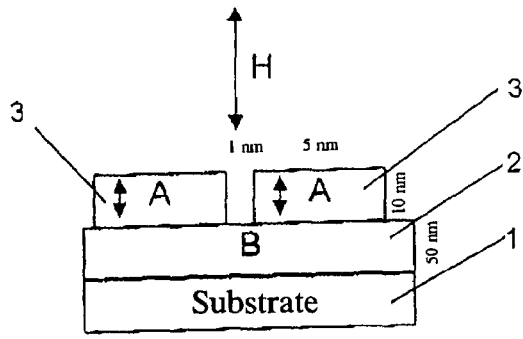

Metamagnetic transition and susceptibility maximum in an itinerant-electron system H. Yamada, Physical Review B, vol. 47, No. 17, May 1, 1993-I.

Dynamic coercivity measurements of antiferromagnetically coupled magnetic media layers J. Lohau, A. Moser, a) D.T. Margulies, E.E. Fullerton, and M.E. Schabes, Applied Physics Letters, vol. 78, No. 18, Apr. 30, 2001.

Gd5(SixGe1-x)$: An ExtremumMaterial** By Vitalij K. Pecharsky* and Karl A. Gschneidner Jr., pp. 683-686.

* cited by examiner

MAGNETIC MEDIUM FOR STORING INFORMATION

BACKGROUND OF THE INVENTION

The invention relates to a magnetic information storage medium, which contains at least two materials A and B, which are connected with one another.

In magnetic data storage, the size of the individual bits is reduced further and further to increase the information density. This involves reducing the grain size; in order to avoid reaching the superparamagnetic limit and to maintain a thermally stable magnetization direction when this is done, hard magnetic materials are used which have greater magnetocrystalline anisotropy. However, this can increase the coercivity, so that switching is no longer possible with the usual writing heads, which can typically produce magnetic fields having a maximum strength of 2 T.

In order nevertheless to able to switch these materials, thermally assisted magnetic writing was developed. This involves heating the storage medium locally, so that the dynamic coercivity is reduced under the write field. Especially promising here are exchange coupled layers, which consist of FePt/FcRh, for example (J. Thiele, S. Maat, E. Fullteron, "FeRh/FePt antiferromagnet/ferromagnet exchange spring media for thermally assisted magnetic recording", Appl. Phys. Lett. 82(17) (2003) 2859). Here the FePt, which is a hard magnetic material, stores the magnetization direction, and the FcRh has the very unusual property of exhibiting a first-order phase transition from the antiferromagnetic low temperature phase to a ferromagnetic high temperature phase. Whereas the remanent data storage takes place below the transition temperature, the storage medium is locally heated briefly above this temperature for the writing. This heating is carried out with an additional finely focussed laser beam, which is costly.

SUMMARY OF THE INVENTION

It is an object of the invention to create a magnetic information storage medium, with which it is possible to write on magnetic media of high coercivity with the usual writing heads and without additional local heating.

The inventive storage medium contains at least two materials A and B, which are connected with one another, material A being a hard magnetic material and material B being a material, which exhibits metamagnetic behavior in a magnetic field. The metamagnetic behavior of material B consists therein that, even after repeatedly passing through an external magnetic field from 0 to 10 tesla at least at a magnetic field strength below 3 tesla, a rise occurs in the magnetization as a function of the magnetic field, and this rise is superproportional and has a positive curvature.

Materials with such metamagnetic behavior are described in E. Stryjewski, N. Giordano "Metamagnetism", Adv. Phys. 26(5) (1977) 48, 7 for example.

The inventive storage medium has some essential advantages over the known magnetic storage media. It is especially advantageous that the magnetization in the metamagnetic material, provided pursuant to the invention, can be influenced by an external magnetic field, so that the material changes over in a certain temperature range from a state of low magnetization (antiferromagnetic or paramagnetic) into a state of high magnetization (ferrimagnetic or ferromagnetic). Thus, it is possible to do without the costly additional heating with an additional laser beam, and the ferromagnetic state can be induced with conventional writing heads. After the writing process, the metamagnetic layer returns to its state of low magnetization, so that the thermal stability is not substantially reduced.

The inventive storage medium can be varied and advantageously and/or expediently designed as follows:

Material B has a first- or second-order phase transition induced by a magnetic field.

In the temperature range from 250° K to 400° K, material B has at least one phase transition which involves a change in the magnetic order and whose transition temperature can be changed, through an external magnetic field, by at least 1° K/tesla.

Material B consists at least 20 atom percent of elements which have magnetic orders at least at one temperature in the range of 1° K to 350° K.

Material B is based on Heusler alloys, manganates, or lanthanates.

Material B is based on the $YCo_2$ phase, with a variation of up to 10 atom percent in the composition.

Material B is based on the $Gd_5(Si_xGe_{1-x})_4$ phase, with x>0.8, with a variation of up to 10 atom percent in the composition.

Material B is based on the $Hf_{1-x}Ta_xFe_2$ phase, with x<0.2, with a variation of up to 10 atom percent in the composition.

Material B is based on the $Ni_2MnGa$ phase, with a variation of up to 10 atom percent in the composition.

Material B contains up to 30 atom percent of alloys of elements, which have no ferrimagnetic or ferromagnetic order/orders above 350° K.

Material B contains up to 20 atom percent of alloys of elements which have magnetic orders at least at one temperature in the range from 1 K to 350° K.

Material B contains alloys made of elements from the group comprising Fe, Co, Ni, Cr, Mn or from the rare earth group of elements.

Material A is ferrimagnetic or ferromagnetic in the temperature range from at least 250° K to 320° K and has an anisotropy field strength of at least 1.5 tesla.

Material A contains the elements Fe, Co, Ni, or Cr, these elements combined constituting at least 20 atom percent.

Material A is formed as a monolayer or as a laminar composite.

Material A is based on at least 90 atom percent of the phases FePt, CoPt, FePd, MnAl, $CrPt_3$, $Co_3Pt$, $Sm_2Co_7$, $Sm_1Co_5$, $Sm_1Co_7$, $Sm_2Co_{17}$, $Sm_2Fe_{17}N_3$, or $Nd_2Fe_{14}B$.

In the case of a laminar composite, material A consists of Co/Pd, Co/Pt, Fe/Pt, or Fe/Pd, the laminar composite having a periodicity of less than 3 nm.

Material A contains up to 30 atom percent of alloys of elements, which do not have any ferromagnetic or ferrimagnetic orders above 350° K.

Material A contains alloys of elements from the group comprising Pt, Cr, Zr, Ta, O, B, C, P, or N.

Material A contains up to 30 atom percent alloys of elements from the group comprising Fe, Co, Ni, Cr, Mn or from the rare earth group of elements.

Material A is in the form of a granular layer, this microstructure arising both during layer growth and also during the subsequent structuring methods.

Material A is not textured or has a texture, in which the minor magnetic axis is oriented in the direction of application.

Materials A and B are in the form of continuous monolayers or multilayers or they are in the form of granular monolayers or multilayers, in which materials A and B are also side by side in the plane of the layer.

Materials A and B are coupled with one another by means of exchange coupling.

Materials A and B are coupled with one another by means of magnetostatic interaction.

For coupling between material A and material B, one or more additional materials are present.

Materials A and B are connected with or covered by other functional materials common for magnetic storage media, such as soft magnetic base layers, seed layers, and corrosion-protection layers.

A nucleating layer of MgO is disposed between materials A and B.

Materials A and B are covered by a protective layer of diamond-like carbon.

BRIEF DESCRIPTION OF TILE DRAWINGS

The invention is explained in greater detail below by means of examples.

Figure 2:
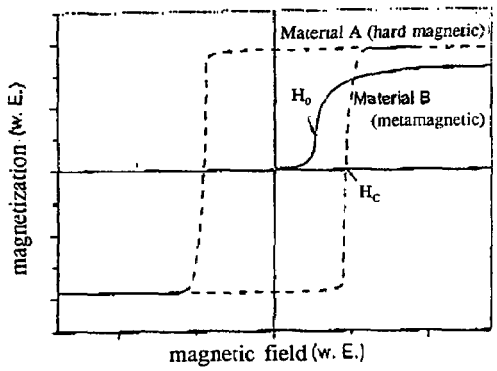
Figure 3:
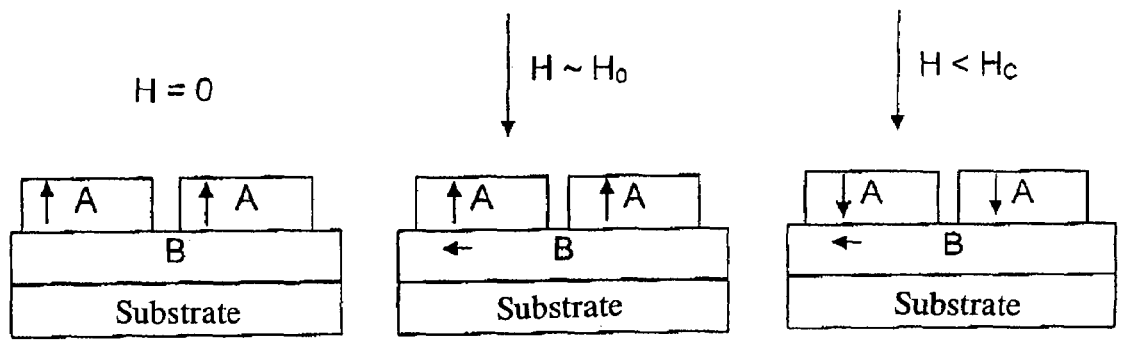
Figure 4:
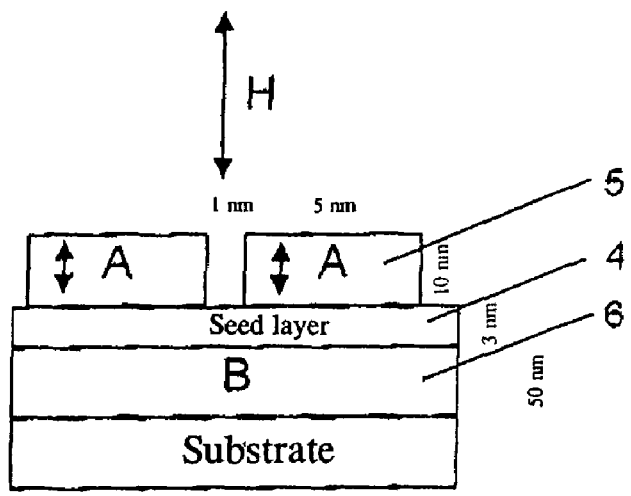
Figure 5:
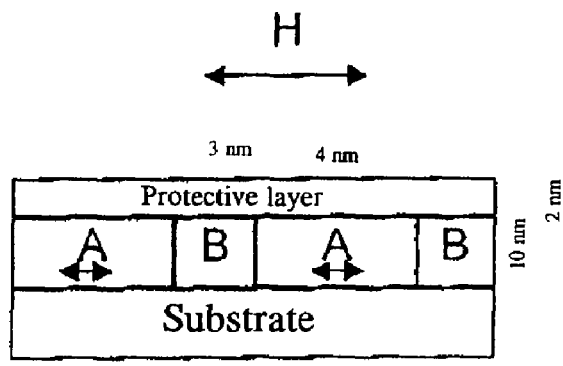
Figure 6:
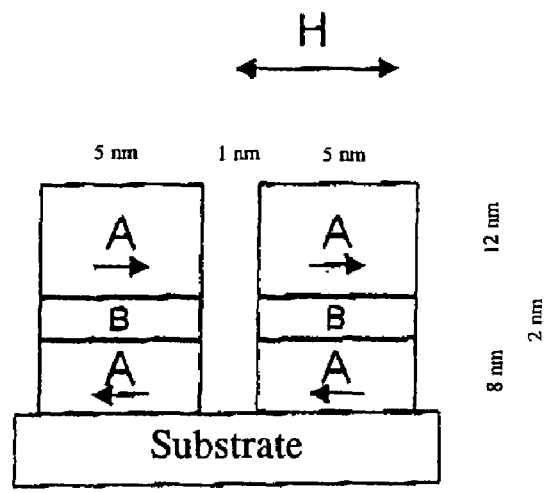

FIG. 1: shows a diagrammatic representation of a magnetic medium for perpendicular recording;

FIG. 2: shows a diagram with magnetization curves;

FIG. 3: shows three illustrations of the switching behavior of the magnetic medium;

FIG. 4: shows a diagrammatic representation of a magnetic medium with an additional seed layer;

FIG. 5: is a diagrammatic representation of a magnetic medium for longitudinal recording; and FIG. 6: shows a diagrammatic representation of a magnetic medium built of a multilayer.

DESCRIPTION OF THE PREFERRED EMBODIMENTS

Example 1

In the magnetic medium shown in FIG. 1, substrate 1, which is made of glass, has a coherent metamagnetic layer 2 of $Hf_{0.7}Ta_{0.3}Fe_2$, about 50 nm thick, which embodies material B. The material and its properties are described in detail in H. G. M. Duijn, E. Brück, A. A. Menovsky, K. H. J. Buschow, F. R. de Boer, R. Coehoorn, M. Winkelmann, and K. Siemensmeyer "Magnetic and transport properties of the itinerant electron system $Hf_{1-x}Ta_xFe_2$", J. Appl. Phys. 81(8) (1997) 4218.

On the metamagnetic layer 2, there is a granular layer 3, which is about 10 nm thick and has hard magnetic behavior; this layer embodies material A. Granular layer 3 is textured for perpendicular recording, so that the minor magnetic axis (symbolized in FIG. 1 by the double arrow) is oriented perpendicularly to substrate 1.

The grains of the granular layer 3 consist of an FePt base alloy with 50 atom percent Fe and 50 atom percent Pt. If the FePt compound has an $L1_0$ ordered structure, it is possible to achieve very high coercivity above 5 tesla (W. Weisheit, L. Schultz, S. Fähler "Textured growth of highly coercive $L1_0$ ordered FePt thin films on single crystalline and amorphous substrates", J. Appl. Phys. (2003), in press). To lower the temperature necessary for setting the order, this material A can also have 5 atom percent Cu and 2 atom percent B alloyed to it. These non-magnetic elements, which do not mix with FePt, can contribute to the magnetic decoupling of the grains, if they are located between the hard magnetic grains.

Laterally, the grains of granular layer 3 have a dimension of 5 nm, and thus lie just above the superparamagnetic limit. The grains are magnetically decoupled from one another by a narrow, about 1 nm wide gap. The material combination FePt and $Hf_{1-x}Ta_xFe_2$ has the advantage that both materials are relatively stable to oxidation, so that here it is possible, under certain circumstances, to do without a protective layer.

The information is stored in the magnetic medium shown in FIG. 1 by a writing head (not shown) with its magnetic field H, the direction of which is symbolized by the double arrow above the granular layer 3.

FIG. 2 shows the magnetization curves in material A of granular layer 3 which, as a textured hard magnet, has open hysteresis with high coercivity $H_c$ and high remanence. Also plotted is a diagrammatic magnetization curve of material B of layer 2, in which the magnetization rises in a superproportional manner to the field. Typical for a first-order transition is an inflection point in the magnetization curve, which is normally taken to be a transition field $H_0$. Material B can also exhibit hysteresis. However, this does not change the qualitative behavior in the first quadrant. If the external magnetic field is sufficient to produce domain walls in material B, they can act, for example through exchange coupling (E. F. Kneller "The Exchange-Spring Magnet: A New Material Principle for Permanent Magnets", IEEE Trans. Mag. 27(4) (1991) 3588), as nucleation cells in material A, and thus lead to switching. Thus, the coupling of materials A and B should reduce the switching field of the laminar structure from $H_c$ to fields around $H_0$. The transition field $H_0$. should lie above the stray field of material A, which is limited by saturation magnetization, so that in the remanent state no magnetization worth mentioning is induced in material B.

FIG. 3 shows the switching behavior of the magnetic medium. The arrows illustrate the magnetization direction. The left picture shows the remanent state without an external magnetic field, in which only the hard magnetic material A has a remanent magnetization, which can withstand thermal fluctuations. In the middle picture, an external magnetic field of the order of magnitude of the transition field $H_0$ is applied for writing. This induces a magnetic moment in the metamagnetic material B. The right picture shows the switched state, which in the laminar structure has already taken place at fields clearly below the value of $H_c$ of an individual layer of material A.

Example 2

FIG. 4 shows an alternative to the storage medium structure shown in Example 1, in which an additional seed layer 4 is present between a layer 5 of a hard magnetic material A and a layer 6 of a metamagnetic material B. Layer 5 consists of an FePt base alloy and layer 6 consists of $Hf_{0.7}Ta_{0.3}Fe_2$.

Seed layer 4 is 3 nm thick and consists of MgO. It serves to form a (001) texture in the FePt layer 5. Seed layer 4 also leads to a granular growth of isolated grains, since the MgO is not wetted by FePt. The coupling between the materials A and B takes place due to magnetostatic interaction.

The other combinations of materials A and B, which are provided pursuant to the invention, may also be provided as storage medium. Thus, material A can itself be built from multilayers. Material A can also consist of a repeated sequence of a monolayer of Co and two monolayers of Pd, for example. Such a sequence is described by G. H. O. Daalderop, P. J. Kelly, and M. F. H. Schuurmans "First-principles calculation of the magnetic anisotropy energy of $(Co)_n/(X)_m$ multilayers", Phys. Rev. B 42(1990) 7270. The use of a separating seed layer also makes it possible for $Ni_2MnGa$, which is relative reactive, to be used as material B.

Example 3

Material combinations, which are especially suitable pursuant to the invention, have many alloying elements in common. Accordingly, in this example, which relates to the arrangement shown in FIG. 5, the hard magnetic material A consists of $SmCo_5$ and the metamagnetic material B consists of $YCo_2$. Using $SmCo_5$, which has a very high anisotropy field of 35 T, allows grains with dimensions below 4 nm to withstand the superparamagnetic limit. In order to be able nevertheless to switch the magnetization, compounds derived from $YCo_2$ are used as the metamagnetic material (H. Yamada, "Metamagnetic Transition and Susceptibility Maximum in an Itinerant-Electron System", Phys. Rev. B 47(17) (1993) 11211), the transition field $H_0$ of which can be reduced drastically by alloying a few percent of Al.

The texture of the $SmCo_5$ layer is such that the minor magnetic c-axis lies in the plane of the film. This is the growth direction preferred by this material, so that longitudinal writing geometry can be used.

The substrate may be an oxygen-free, high-strength aluminum alloy.

For protection against corrosion, the layers are given a protective layer, which here consist of a 2 nm thick diamond-like carbon layer.

In this example, the metamagnetic material B is located in a 3 nm wide area between the hard magnetic grains A. Thus, in the absence of an external magnetic field, the grains are magnetically decoupled from one another, and when an external magnetic field is applied a partial coupling occurs.

Example 4

The longitudinal storage medium shown in FIG. 6 is built with antiferromagnetically coupled multilayers. As is known, multilayers achieve better thermal stability, without an increase in the coercivity (J. Lohau, A. Moser, D. T. Margulies, E. E. Fullerton, M. E. Schabes, "Dynamic coercivity measurements of antiferromagnetically coupled magnetic media layers", Appl. Phys. Lett. 78(18) (2001) 2748). Here the information is read out by the stray field of the thicker top layer A.

Pursuant to the invention, the intermediate layer B in this storage medium is not paramagnetic, as is usually the case, but rather exhibits metamagnetic behavior. During writes, an external magnetic field induces magnetization in material B, so that the antiferromagnetic coupling of the two hard magnetic layers is no longer favored, but rather a parallel orientation of the magnetization This produces an unstable intermediate state which makes it easier for an external magnetic field to change the magnetization direction. This further reduces the write field.

The invention claimed is:

1. A magnetic medium for storing information, comprising:
    at least two materials A and B connected with one another;
    said material A being a hard magnetic material, said material A having a first coercivity Hc and a first remenence at a given temperature when independently situated;
    said material B being a material which exhibits metamagnetic behavior in a magnetic field at said given temperature, the metamagnetic behavior of the material B being such that, even after passing repeatedly through an external magnetic field from 0 to 10 Tesla at least at a magnetic field strength below 3 Tesla, an increase in magnetization occurs as a function of the magnetic field, the increase being superproportional and having a positive curvature and occurring at a transition field $H_o$ which is less than $H_c$ at said given temperature;
    said increase in magnetization of said material B at said transition field level $H_o$ being sufficient to produce domain walls in said material B to function as nucleation cells in said material A at said given temperature so as to reduce a switching field of material A to about said transition field $H_o$ so as to permit writing to material A at said given temperature while said writing remains stable at said given temperature.

2. The magnetic medium of claim 1, wherein said material B has a first or second-order phase transition induced by a magnetic field.

3. The magnetic medium of claim 1, wherein said material B has at least one phase transition in the temperature range from 250° K to 400° K, which involves a change in the magnetic order and transition temperature of which can be changed by an external magnetic field by at least 1° K/Tesla.

4. The magnetic medium of claim 1, wherein at least 20 atom percent of said material B comprises elements, which have magnetic orders at least at one temperature in the range from 1° K to 350° K.

5. The magnetic medium of claim 1, wherein said material B is based on Heusler alloys, manganates, or lanthanates.

6. The magnetic medium of claim 1, wherein said material B is based on the $YCo_2$, with a variation in the composition of up to 10 atom percent.

7. The magnetic medium of claim 1, wherein said material B is based on the $Gd_5(Si_xGe_{1-x})_4$ with x>0.8, with a variation in the composition of up to 10 atom percent.

8. The magnetic medium of claim 1, wherein said material B is based on the $Hf_{1-x}Ta_xFe_2$ with x<0.2, with a variation in the composition of up to 10 atom percent.

9. The magnetic medium of claim 1, wherein said material B is based on the $Ni_2MnGa$, with a variation in the composition of up to 10 atom percent.

10. The magnetic medium of claim 1, wherein said material B comprises alloys of elements which have no ferrimagnetic or ferromagnetic order/orders above 350° K, said alloys being present in quantities of not more than 30 atom percent.

11. The magnetic medium of claim 1, wherein said material B has alloys of elements which have magnetic orders at least at one temperature in the range from 1° K to 350° K, said alloys being present in quantities of not more than 20 atom percent.

12. The magnetic medium of claim 11, wherein said material B comprises alloys made of elements from the group comprising Fe, Co, Ni, Cr, Mn or from the rare earth group of elements.

13. The magnetic medium of claim 1, wherein said material A is ferrimagnetic or ferromagnetic in the temperature range from at least 250° K to 320° K and has an anisotropy field strength of at least 1.5 Tesla.

14. The magnetic medium of claim 1, wherein said material A comprises the elements Fe, Co, Ni, or Cr, the proportion of these elements combined being at least 20 atom percent.

15. The magnetic medium of claim 1, wherein said material A is formed as a monolayer or as a laminar composite.

16. The magnetic medium of claim 15, wherein at least 90 atom percent of said material A is consists of at least one of FePt, CoPt, FePd, MnAl, $CrPt_3$, $Co_3Pt$, $Sm_2Co_7$, $Sm_1Co_5$, $Sm_1Co_7$, $Sm_2Co_{17}$, $Sm_2Fe_{17}N_3$, or $Nd_2Fe_{14}B$.

17. The magnetic medium of claim 15, wherein the laminar composite of said material A includes at least one of Co/Pd, Co/Pt, Fe/Pt, or Fe/Pd, the laminar structure having a periodicity of less than 3 nm.

18. The magnetic medium of claim 1, wherein said material A comprises alloys of elements, which do not have any ferromagnetic or ferrimagnetic orders above 350° K, said alloys being present in quantities of not more than 30 atom percent.

19. The magnetic medium of claim 18, wherein said material A comprises alloys of elements from the group comprising Pt, Cr, Zr, Ta, O, B, C, P, or N.

20. The magnetic medium of claim 1, wherein said material A comprises alloys of elements from the group comprising Fe, Co, Ni, Cr, Mn or from the rare earth group of elements, said alloys being present in quantities of not more than 30 atom percent.

21. The magnetic medium of claim 1, wherein said material A is in the form of a granular layer, this microstructure having arisen during layer growth, as well as during the subsequent structuring methods.

22. The magnetic medium of claim 1, wherein said material A is not textured.

23. The magnetic medium of claim 1, wherein said material A has a texture in which the minor magnetic axis is oriented in the direction of application.

24. The magnetic medium of claim 1, wherein said materials A and B are in the form of coherent monolayers or multilayers.

25. The magnetic medium of claim 1, wherein said materials A and B are present in the form of granular monolayers or multilayers in which said materials A and B are also present side by side in the plane of the layer.

26. The magnetic medium of claim 1, wherein said materials A and B are coupled with one another by means of exchange coupling.

27. The magnetic medium of claim 1, wherein said materials A and B are coupled with one another by means of magnetostatic interaction.

28. The magnetic medium of claim 1, wherein for coupling between said material A and said material B, one or more additional materials are present.

29. The magnetic medium of claim 1, wherein said materials A and B are connected with or covered by other functional materials, conventional for magnetic storage media including and at least one of the group consisting of soft magnetic base layers, seed layers, and corrosion-protection layers.

* * * * *